United States Patent

[11] 3,539,087

[72] Inventor Randolph Burch
 Summit Point, West Virginia
[21] Appl. No. 767,242
[22] Filed Oct. 14, 1968
[45] Patented Nov. 10, 1970
[73] Assignee William S. Doig Inc.
 Haverstraw, New York
 a corporation of New York

[54] AUTOMATIC FASTENING DEVICE
 15 Claims, 3 Drawing Figs.
[52] U.S. Cl. .................................................. 227/3,
 227/44, 227/100
[51] Int. Cl. .................................................. B27f 7/06
[50] Field of Search .......................................... 227/2, 3, 4,
 5, 6, 7, 44, 99, 100, 152, 153

[56] References Cited
 UNITED STATES PATENTS
 3,370,769 2/1968 Price ........................... 227/44X
 3,443,303 5/1969 Groat .......................... 227/44X Primary Examiner—Granville Y. Custer, Jr.
Attorney—Holman and Stern ABSTRACT: A device for assembling an article from a plurality of elements wherein a plurality of elements of the article are temporarily secured together in a jig means in a predetermined relationship and translated to a fastening device or nailing machine where successive fastening or nailing operations are performed on the elements under the control of a plurality of selectively spaced stops on the jig means and an associated limit switch. After the final fastening or nailing operation is completed, the elements of the article, secured together by the fastening means or nails, are returned to their initial position.

Patented Nov. 10, 1970
3,539,087
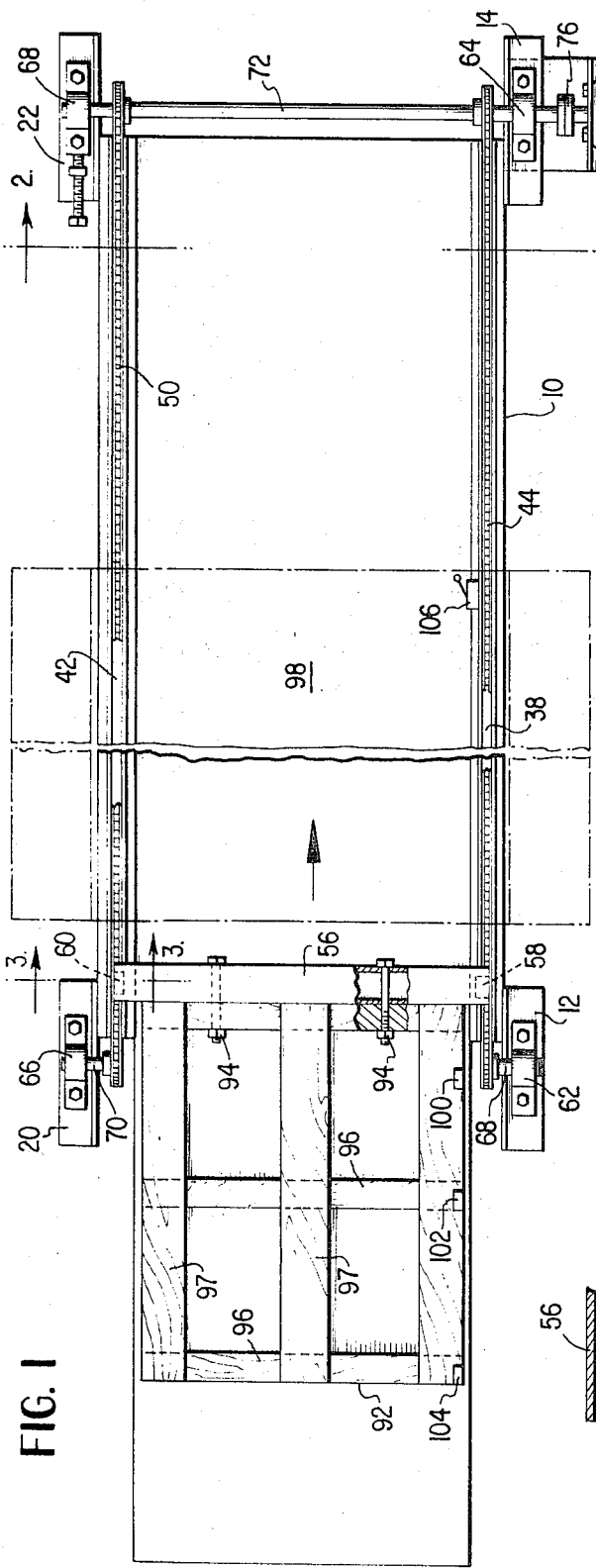
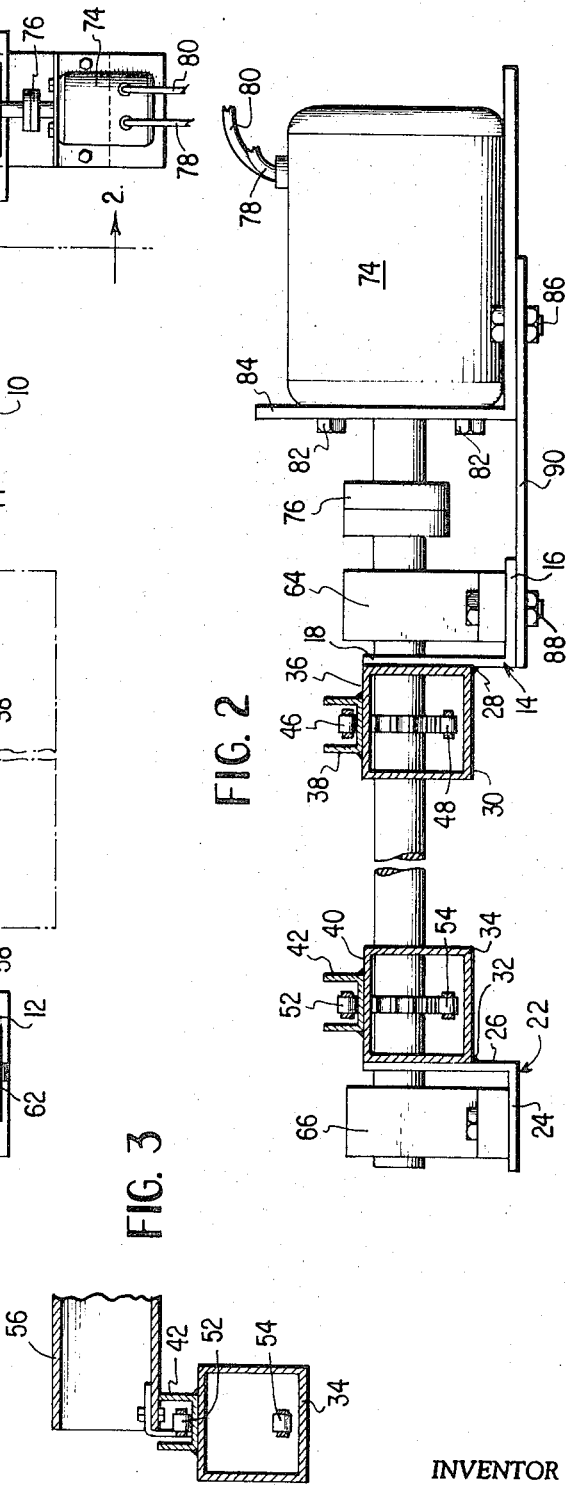
INVENTOR
RANDOLPH BURCH
BY Jacobi & Davidson
ATTORNEYS.

AUTOMATIC FASTENING DEVICE

The invention relates to a device for assembling an article from a plurality of elements and particularly to a device wherein such elements are temporarily held together as a unit in a jig, or equivalent device, in a predetermined relationship and translated from an initial position to a fastening device, such as an automatic mailing machine, where they are secured together by fastening means and then returned by the jig, secured together in the predetermined relationship, to their initial position.

While devices for assembling various articles such as box sides, crate sides, door frames and window frames are known, such devices are generally of complicated construction, extremely bulky, costly to purchase and operate or unreliable in operation.

Taking into consideration the foregoing deficiencies, it is the primary object of the present invention to overcome such deficiencies and, moreover, to bring about other advantages not generally possible with existing devices for assembling an article from a plurality of elements.

A further object of the present invention is to provide a novel jig construction into which a plurality of elements necessary to form an assembled article are arranged in a predetermined pattern for translation to a fastening means.

A still further object of the invention is to provide a novel translation device for moving a jig construction from an initial position, where the elements of an article to be assembled are temporarily mounted on the jig, to a position where such elements are secured together by a fastening device.

Another object of the invention is to provide a device for translating a jig on which elements, that form an article and are temporarily assembled in a predetermined pattern, are translated from an initial position spaced from a fastening device for securing said elements together, to a fastening device, then initiating operation of said fastening device to perform one or more fastening operations upon said jig reaching said fastening means, and, upon completion of said last fastening operation, returning the jig to its initial position.

Yet another object of the invention is to provide a jig translating device wherein moving elements of the translating device are arranged to move within channels and conduits so as to protect persons operating such article-assembling device against injury.

An additional object of the invention is to provide a structure wherein a jig, which is designed to temporarily secure a plurality of elements that are to be fastened together in a particular pattern, may be readily replaced by another jig which is designed to temporarily secure a plurality of such elements in a different predetermined pattern.

Another additional object of the present invention is to provide improvements in an article-assembling device according to the teachings of the subject invention, that are simple in construction, durable and made of materials of relatively low cost.

The invention will be better understood and objects other than those set forth above will become apparent, after reading the following detailed description.

The description refers to the annexed drawings presenting preferred and illustrative embodiments of the invention.

IN THE DRAWINGS

FIG. 1 is a plan view of a device, according to the present invention, for temporarily securing together, in a predetermined pattern, a plurality of elements and for translating said elements to and from a fastening device.

FIG. 2 is a sectional view taken along the line 2—2 of FIG. 1.

FIG. 3 is a sectional view taken along the line 3—3 of FIG. 1.

DESCRIPTION OF THE PREFERRED EMBODIMENT

Referring to the drawings, it is to be noted that the article-assembling device 10 includes a first pair of longitudinally spaced support members 12 and 14, each having a base portion 16 and an upstanding portion 18 extending at right angles to the base portion 16 and a second pair of longitudinally spaced support members 20 and 22, each having a base portion 24 and an upstanding portion 26 extending at right angles to the base portion 24.

Extending longitudinally between the pair of longitudinally spaced support members 12, 14 and secured thereto in any conventional manner such as welding at 28 is a first tubular member 30 that is rectangular, and preferably square, in cross section. Likewise, extending between the pair of longitudinally spaced support members 20, 22 and also secured thereto in any conventional manner such as by welding at 32 is another tubular member 34 that is also rectangular, and preferably square, in cross section. The tubular members 30 and 34 are mounted on their associated supports 12, 14, 20 and 22 so that they are parallel.

Secured to the upper surface 36 of tubular member 30 and coextensive therewith is an upwardly facing open channel member 38. A similar upwardly facing open channel member 42 is secured to the upper face of tubular member 34.

An endless roller chain 44 has an upper portion 46 extending along the upwardly facing channel member 38 and a lower portion 48 extending through tubular member 30. A similar endless chain 50 has an upper portion 52 extending along the upwardly facing channel member 42 and a lower portion 54 extending through tubular member 34.

A head block 56 of any suitable construction, but preferably hollow, extends across and is slidably mounted on the upper edges of channel members 38 and 42. The head block 56 is secured at one end to roller chain 44 by a coupling member 58 and at its other end to roller chain 50 by a coupling member 60.

Bearing blocks 62, 64, 66 and 68 are mounted on base portions 16 and 24 of support members 12, 14 20 and 22. Each of the bearing blocks 62 and 64 rotatably support stub shafts 68 and 70 that carry sprockets (not illustrated) that, respectively, cooperate with roller chains 44 and 50. Bearing blocks 64 and 68 rotatably support a drive shaft 72 that carries sprockets (not illustrated) that drivingly cooperate with roller chains 44 and 50. The drive shaft 72 is connected by a coupling 76 to a conventional reversing motor 74, shown herein as a reversing hydraulic motor having motive fluid conduits 78 and 80 attached thereto for reversing the direction of flow of driving fluid therethrough. The motor 74 is attached by bolts 82 to an L-shaped bracket 84 that in turn is attached by bolts 86, 88 and support arm 90 to base portion 16 of support member 14.

A jig 92, attached to head block 56 by bolts 94 is provided in order to temporarily hold pieces of lumber or similar elements 96, 97 in a predetermined pattern to form an assembled article and translate them from an initial position spaced from a fastening device to a fastening device, such as a nailing machine 98, illustrated in FIG. 1 by dotted lines where such elements are fastened together, and returning the elements, fastened together as completed articles, to the initial position where they are removed as such from the jig 92.

The jig 92 is provided with a plurality of selectively positioned stops 100, 102, 104 that cooperate with suitably placed limit switch means 106 to control the operation of the jig drive means and fastening device or nailing machine 98.

More specifically, the limit switch means 106 cooperates with the stop means 100, 102, 104 in such a manner that the movement of the jig means 92 to the fastening device or nailing machine 98 is started and stopped successively so that the elements 96 placed transversely across the jig means 92, in spaced relation with respect to each other, are fastened to elements 97 placed temporarily longitudinally along the jig means 92 in spaced relation with respect to each other.

When it is desired to operate the device herein described to form an article of a particular configuration from a plurality of elements, the jig means 92 will be positioned, as illustrated in FIG. 1, in spaced relation to the fastening device or nailing machine 98. The various elements 97 are temporarily secured longitudinally along the jig means 92 in the position they are to assume in the completed article. The various elements 96 are, similarly, secured temporarily across jig means 92. Fluid under pressure, such as oil, is then introduced into the hydraulic motor 74 through fluid conduit 78 and exhausted through fluid conduit 80. The fluid flowing through the hydraulic motor from fluid conduit 78 to fluid conduit 80 will cause the fluid motor to operate in a first or, for example, a clockwise direction and thereby rotate drive shaft 72 in a clockwise direction. Rotation of the drive shaft 72 in a clockwise direction will cause the sprockets mounted on the drive shaft 72 to operate the roller chains 44 and 50, respectively, along upwardly facing open channels 38 and 42 and through tubular members 30 and 34. Such operation of the roller chains 44 and 50 will cause translation of the head block 56 and jig means 92, carrying the properly positioned elements 96 and 97, until stop means 100 on the jig means 92 engages limit switch 106. The movement of the jig means 92 in the direction toward the fastening device or nailing machine 98 will then be stopped and an initial operation of the fastening device or nailing machine 98 will then be effected. After completion of this initial operation of the fastening device or nailing machine 98, the jig means 92 will be again advanced and operated successively until all of the elements 96, 97 on the jig means have been secured together with fastening means or nails by the fastening device 98. After the last fastening or nailing operation has been completed, the limit switch 106 will be actuated in a manner to return the jig means 92 to its initial or starting position. The completely assembled article is then removed from the jig means 92 and another set of elements 96, 97 to be secured together will be temporarily placed on the jig means 92 in a predetermined pattern for translation to the fastening device or nailing machine 98.

Details of the circuitry whereby the various stop means actuate the limit switch to perform the various operations set forth hereinabove have not been set forth herein since, having explained the overall device and its function comprehensively, the details of such circuitry are well within the skill of the art.

Further, although the drawings illustrate the manufacture of a wooden pallet with the device hereof, and while the device hereof is particularly adapted for the production of pallets of various sizes, the device could readily be adapted for securing together elements forming other articles of a similar nature.

After reading the foregoing description, it will be apparent that the objects set forth initially have been successfully achieved.

I claim:

1. In a device for assembling an article from a plurality of elements wherein said elements are to be secured together by a fastening device, the improvement which comprises: a support means; translating means mounted on said support means for movement relative thereto; jig means for temporarily holding the elements in a predetermined assembled relation; means for attaching said jig means to said translating means; means for moving said translating means from an initial position in one direction so as to position said jig means in operative association with the fastening device; and means, carried by said jig means, for automatically actuating the fastening device at predetermined locations along said jig means as said jig means is moved into operative association therewith to secure said elements together to form said article.

2. A device for assembling an article from a plurality of elements as defined in claim 1 wherein said support means comprises at least one upwardly facing open channel means and said means for moving said translating means includes an endless driving means, a portion of which is movable within said channel means.

3. A device for assembling an article from a plurality of elements as defined in claim 2 wherein said support means further includes a tubular mounting means for the channel means and a portion of the endless driving means extends through said tubular mounting means.

4. A device for assembling an articles from a plurality of elements as defined in claim 1 wherein said support means further comprises at least a pair of laterally spaced upwardly facing open channel means and said means for moving said translating means is actuated by an endless driving means associated with each channel means, and wherein a portion of each of said driving means is movable within its associated channel means.

5. A device for assembling an article from a plurality of elements as defined in claim 4 wherein said translating means extends transversely across all of said channel means.

6. A device for assembling an article from a plurality of elements as defined in claim 4 wherein said support means further includes a tubular mounting means for each of said channel means and a portion of each of said endless driving means extends through its associated tubular mounting means.

7. A device for assembling an article from a plurality of elements as defined in claim 6 wherein said translating means extends transversely across all of said channel means.

8. A device for assembling an article from a plurality of elements as defined in claim 1 wherein said means for automatically actuating said fastening device further includes stop means selectively positioned at predetermined locations along said jig means.

9. A device for assembling an article from a plurality of elements as defined in claim 8 wherein said means for automatically actuating said fastening device further includes limit switches actuated by said stop means.

10. A device for assembling an article from a plurality of elements as defined in claim 1 wherein said support means comprises at least a pair of upwardly facing open channel means, said means for moving said translating means includes an endless driving means associated with each said channel means with a portion of each said driving means movable within its associated channel means, and wherein said means for automatically actuating said fastening device includes stop means selectively positioned at predetermined locations along said jig means.

11. A device for assembling an article from a plurality of elements as defined in claim 10 wherein said means for automatically actuating said fastening device further includes limit switches actuated by said stop means.

12. A device for assembling an article from a plurality of elements as defined in claim 1 wherein means are provided for reversing the direction of movement of said jig means after operation of said fastening device has been completed to return said jig means to its initial position.

13. A device for assembling an article from a plurality of elements as defined in claim 12 wherein said means for reversing the direction of movement of said jig means further includes a stop means positioned on said jig means.

14. A device for assembling an article from a plurality of elements as defined in claim 13 wherein said means for reversing the direction of movement of said jig means further includes limit switches.

15. In a device for assembling an article from a plurality of elements as defined in claim 1 wherein said support means comprises a plurality of laterally spaced, parallel upwardly facing open channels that are, respectively, supported upon square tubing means; said translating means comprises a head block that extends transversely across all of said channel means and to which said jig means is removably attached for substitution by bolt means; said means for moving said translating means comprises: a pair of endless roller driving chains, each of which has one portion thereof extending along and movable within its associated open channel and another portion extending along and movable in its associated square tubing; a rotatable shaft; a pair of sprockets keyed to said shaft, one in engagement with each of said roller driving chains; a pillar block for supporting said shaft including chain tensioning means; a reversing hydraulic motor means mounted so as to drive said shaft; and fluid supply means associated with said motor means for reversing the direction of rotation of said shaft.